US008031355B2

(12) United States Patent
Nakano

(10) Patent No.: US 8,031,355 B2
(45) Date of Patent: Oct. 4, 2011

(54) COMMUNICATION DEVICE

(75) Inventor: Keiichi Nakano, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 866 days.

(21) Appl. No.: 12/039,373

(22) Filed: Feb. 28, 2008

(65) Prior Publication Data

US 2008/0204818 A1  Aug. 28, 2008

(30) Foreign Application Priority Data

Feb. 28, 2007  (JP) ................................. 2007-048583

(51) Int. Cl.
G06K 15/00 (2006.01)
G06F 3/12 (2006.01)

(52) U.S. Cl. ...................................... 358/1.15; 358/1.13

(58) Field of Classification Search .................. 358/1.15, 358/2.1, 1.9, 434, 435, 436, 400, 401, 1.18, 358/1.16, 474, 3.28
See application file for complete search history.

(56) References Cited

U.S. PATENT DOCUMENTS

| 4,855,839 | A | 8/1989 | Saito |
| 6,827,279 | B2 | 12/2004 | Teraura |
| 7,475,819 | B2* | 1/2009 | Moriyama et al. ............. 235/451 |
| 2002/0170973 | A1 | 11/2002 | Teraura |
| 2006/0124723 | A1* | 6/2006 | Satake et al. ................. 235/375 |
| 2006/0170964 | A1 | 8/2006 | Matsuda |
| 2006/0176510 | A1 | 8/2006 | Nishizaqa |
| 2006/0250252 | A1* | 11/2006 | Nagai et al. ................. 340/572.7 |
| 2007/0058189 | A1* | 3/2007 | Yaguchi ........................ 358/1.13 |
| 2007/0075139 | A1* | 4/2007 | Hammond et al. ............. 235/435 |
| 2007/0091343 | A1* | 4/2007 | Morita ......................... 358/1.13 |
| 2007/0241903 | A1* | 10/2007 | Shimazu et al. ............. 340/572.1 |
| 2008/0123128 | A1* | 5/2008 | Powers et al. ................. 358/1.15 |
| 2008/0204802 | A1* | 8/2008 | Tanimoto ...................... 358/1.15 |
| 2009/0066513 | A1* | 3/2009 | Kondo et al. ................ 340/572.1 |
| 2009/0072978 | A1* | 3/2009 | Tilson, Jr. ................... 340/572.9 |

FOREIGN PATENT DOCUMENTS

| JP | S63-146559 A | 6/1988 |
| JP | 2002-337426 A | 11/2002 |
| JP | 2005-186579 A | 7/2005 |
| JP | 2005348027 A | 12/2005 |
| JP | 2006-211559 A | 8/2006 |

OTHER PUBLICATIONS

European Search Report in corresponding European Application No. EP 08006383.
Japan Patent Office; Office Action in Japanese Patent Application No. 2007-048583 (counterpart to the above-captioned U.S. patent application) mailed Feb. 17, 2009.

* cited by examiner

Primary Examiner — Jerome Grant, II
(74) Attorney, Agent, or Firm — Baker Botts L.L.P.

(57) ABSTRACT

A communication device has an image reading unit, a wireless tag reading unit, a transmitting unit, a detecting unit, and a data-size notifying unit. The image reading unit reads image data from an original document on a page basis. The original document has a wireless tag including wireless tag data. The wireless tag data has a data size. The wireless tag reading unit reads the wireless tag data from the wireless tag. The transmitting unit associates the image data with the wireless tag data on a page basis to transmit the associated image data and wireless tag data to another device. The detecting unit detects the data size of the wireless tag data as size information. The data-size notifying unit notifies the another device of the size information.

9 Claims, 7 Drawing Sheets

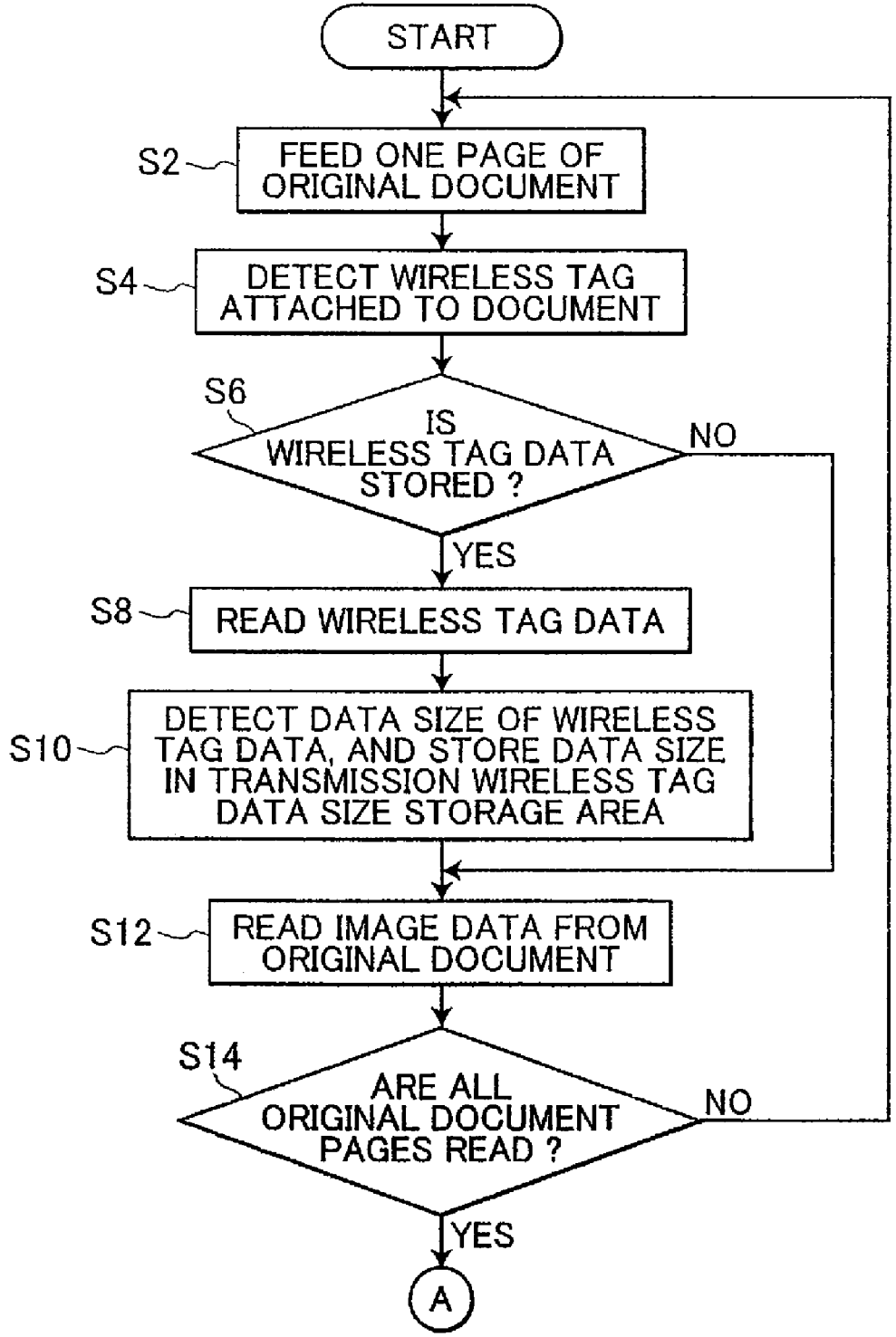

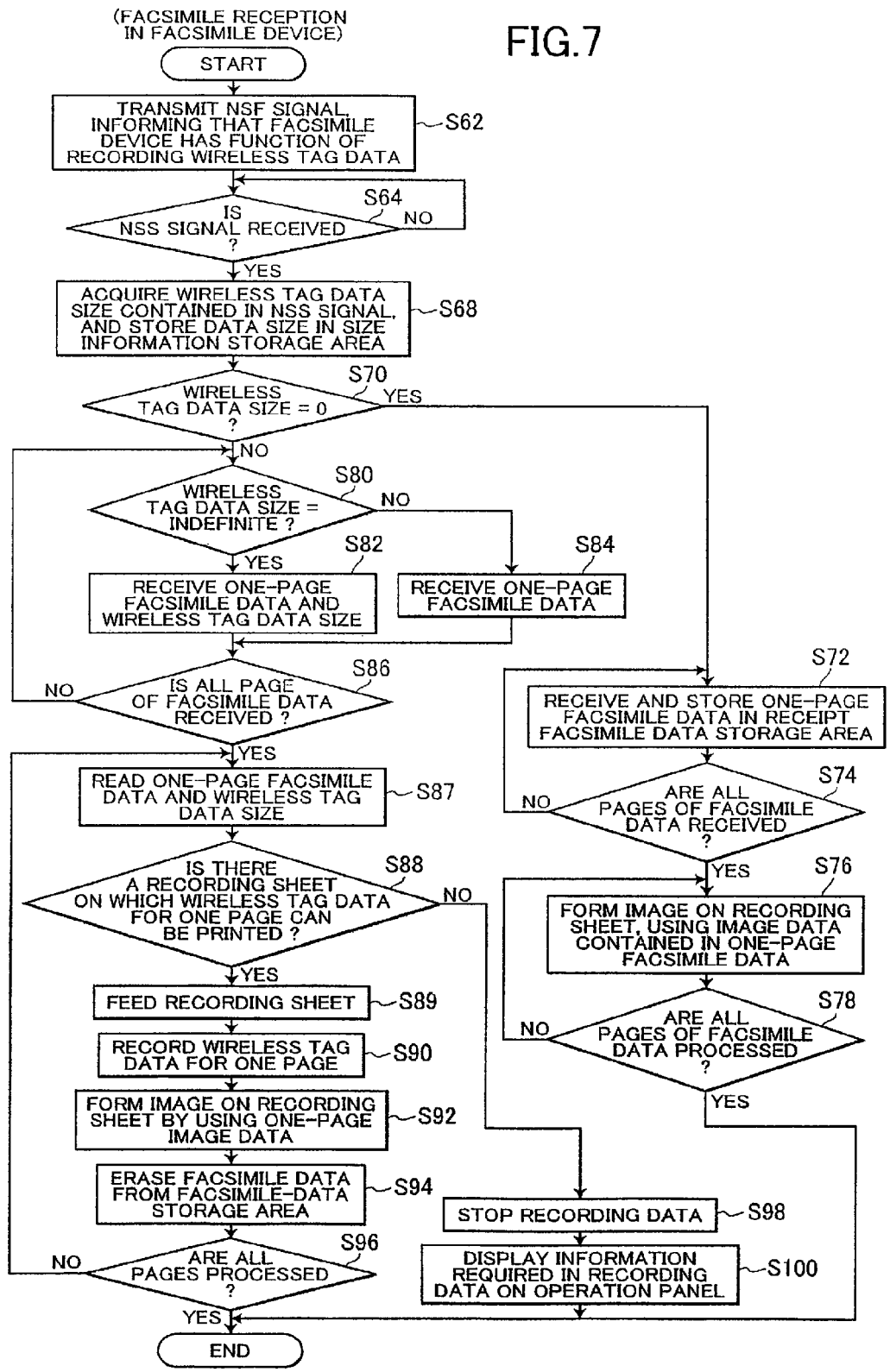

COMMUNICATION DEVICE

CROSS REFERENCE TO RELATED APPLICATIONS

This application claims priority from Japanese Patent Application No. 2007-048583 filed Feb. 28, 2007. The entire content of the priority application is incorporated herein by reference.

TECHNICAL FIELD

The present invention relates to a communication device. More particularly, the invention relates to a communication device that can transmit and receive image data and wireless tag data when the wireless tag data is associated with the image data.

BACKGROUND

Japanese Patent Application Publication No. 2005-348027 discloses a communication terminal device that can read data telephone number and facsimile number from a wireless tag embedded in a business card for communication.

However, the disclosed technology does not propose any specific method for transmitting and/or receiving the data recorded in the wireless tag through the communication networks. In view of this, the disclosed technology does not fully utilize wireless tag.

SUMMARY

An object of the invention is to provide a communication device that transmits and receives image data and wireless tag data, forms an image on a recording medium based on the image data, and writes wireless tag data into the wireless tag attached to the recording medium.

The present invention provides a communication device having an image reading unit, a wireless tag reading unit, a transmitting unit, a detecting unit, and a data-size notifying unit. The image reading unit reads image data from an original document an a page basis. The original document has a wireless tag including wireless tag data. The wireless tag data has a data size. The wireless tag reading unit reads the wireless tag data from the wireless tag. The transmitting unit associates the image data with the wireless tag data on a page basis to transmit the associated image data and wireless tag data to another device. The detecting unit detects the data size of the wireless tag data as size information. The data-size notifying unit notifies the another device of the size information.

The present invention provides a communication device having a receiving unit, a recording unit, a data-size information acquiring unit, and a recording-control unit. The receiving unit receives image data on a page basis and wireless tag data associated with the image data. The wireless tag data has data size. The recording unit forms an image on a recording medium on the basis of the image data. The recording medium includes a wireless tag having a storage capacity. The recording unit writes the wireless tag data in the wireless tag. The data-size information acquiring unit acquires the data size of the wireless tag data as size information. The recording-control unit controls formation of the image and writing of the wireless tag data by the recording unit in accordance with the size information.

BRIEF DESCRIPTION OF THE DRAWINGS

The particular features and advantages of the invention as well as other objects will become apparent from the following description taken in connection with the accompanying drawings, in which:

FIG. 5 is a flowchart showing a former part of a facsimile-transmission procedure;

FIG. 7 is a flowchart showing a facsimile reception procedure.

DETAILED DESCRIPTION

Figure 1:
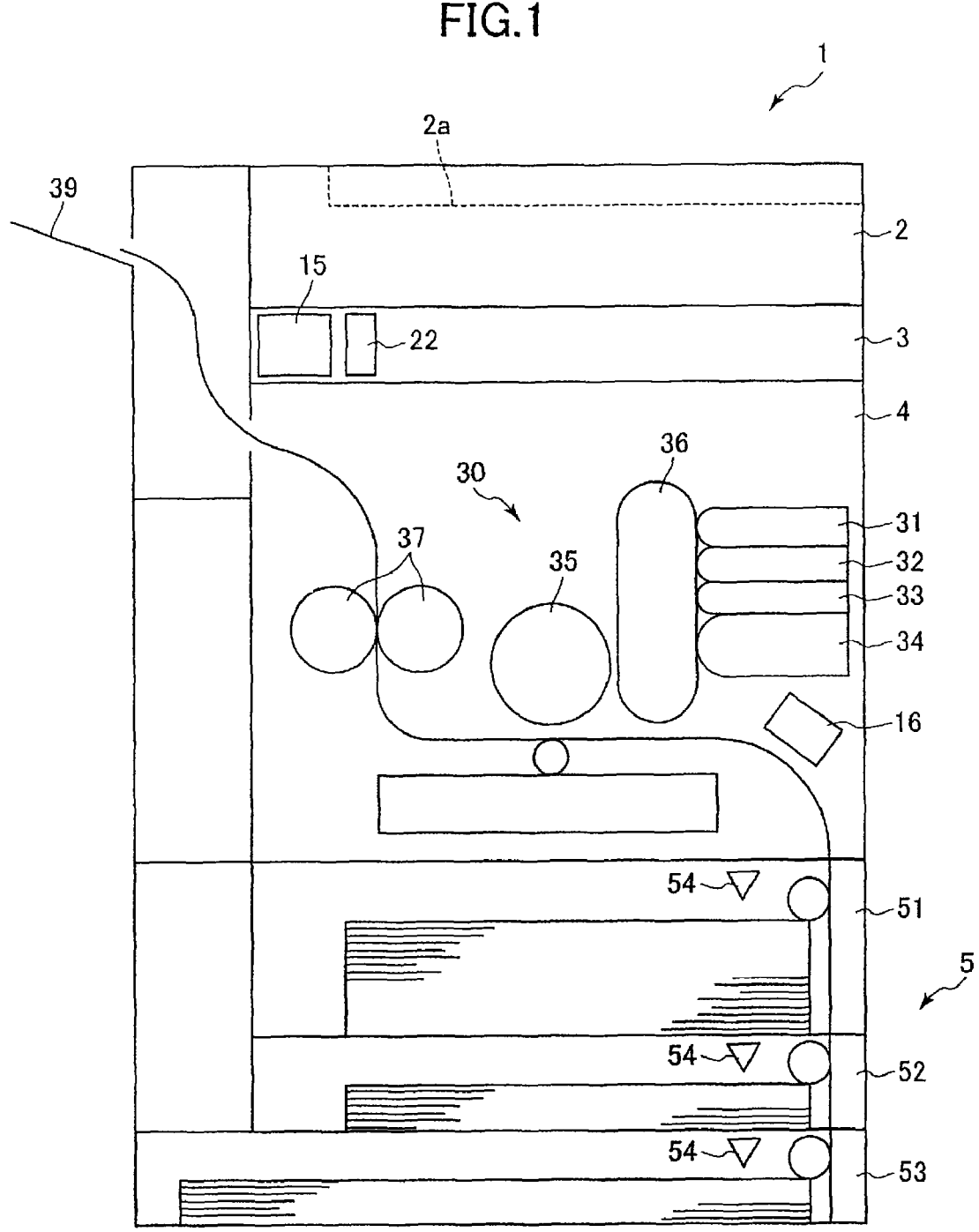
FIG. 1 is a schematic sectional view of a facsimile device of an embodiment according to the present invention.

An embodiment of the present invention will be described, with reference to the accompanying drawings. Referring to FIG. 1, a facsimile device 1 has an automatic document feeder 2, a scanner unit 3, a printer unit 4, and a sheet-feeding tray unit 5.

The automatic document feeder 2 has a document table unit 2a. An original document to be sent by facsimile is placed on the document table unit 2a with the surface thereof facing downward. When a user pushes a start key (not shown) provided on the facsimile device 1, the original document is fed page by page to the scanner unit 3. After the scanner unit 3 has read data from each page, the original document is ejected through a document-ejecting port (not shown).

The scanner unit 3 has a wireless tag reader 15 and a scanner 22. The wireless tag reader 15 reads data recorded in a wireless tag attached to the original document by wireless. The scanner 22 reads image data from the original document. In this embodiment, the wireless tag is a recording medium on which data is written and read without physically contacting therewith and called as an IC tag or a radio frequency identification tag (RFID). The "wireless tag attached to an original document" means not only a wireless tag affixed to the document, but also, for example, a wireless tag embedded in the document.

The printer unit 4 has a wireless tag writer 16 and a laser printer 30. The wireless tag writer 16 is configured to write data in a wireless tag attached to a recording sheet fed from the sheet-feeding tray unit 5. The laser printer 30 has a yellow (Y) station 31, a magenta (M) station 32, a cyan (C) station 33, and a black (K) station 34. The Y station 31 contains yellow toner, the M station 32 contains magenta toner, the C station 33 contains cyan toner, and the K station 34 contains black toner. The laser printer 30 further has a transfer drum 35, an intermediate-transfer belt 36, and fixing rollers 37. The intermediate-transfer belt 36 transfers toner from the stations 31, 32, 33 and 34 to the transfer drum 35. Any recording sheet to which the image is formed by the laser printer 30 is ejected onto an ejected sheet stacker 39.

The sheet-feeding tray unit 5 has three sheet-feeding trays 51, 52 and 53. Each of the sheet-feeding trays 51, 52 and 53 has a sensor 54. The sensor 54 detects whether the wireless tag is attached to the sheet accommodated in the sheet-feeding trays 51, 52 and 53. If the wireless tag is attached to the sheet, the sensor 54 detects a vacant writing capacity of the wireless tag. In other words, the sensor 54 can detect how much data can be written in the wireless tag that is attached to the recording sheet accommodated in the sheet-feeding tray.

Figure 2:
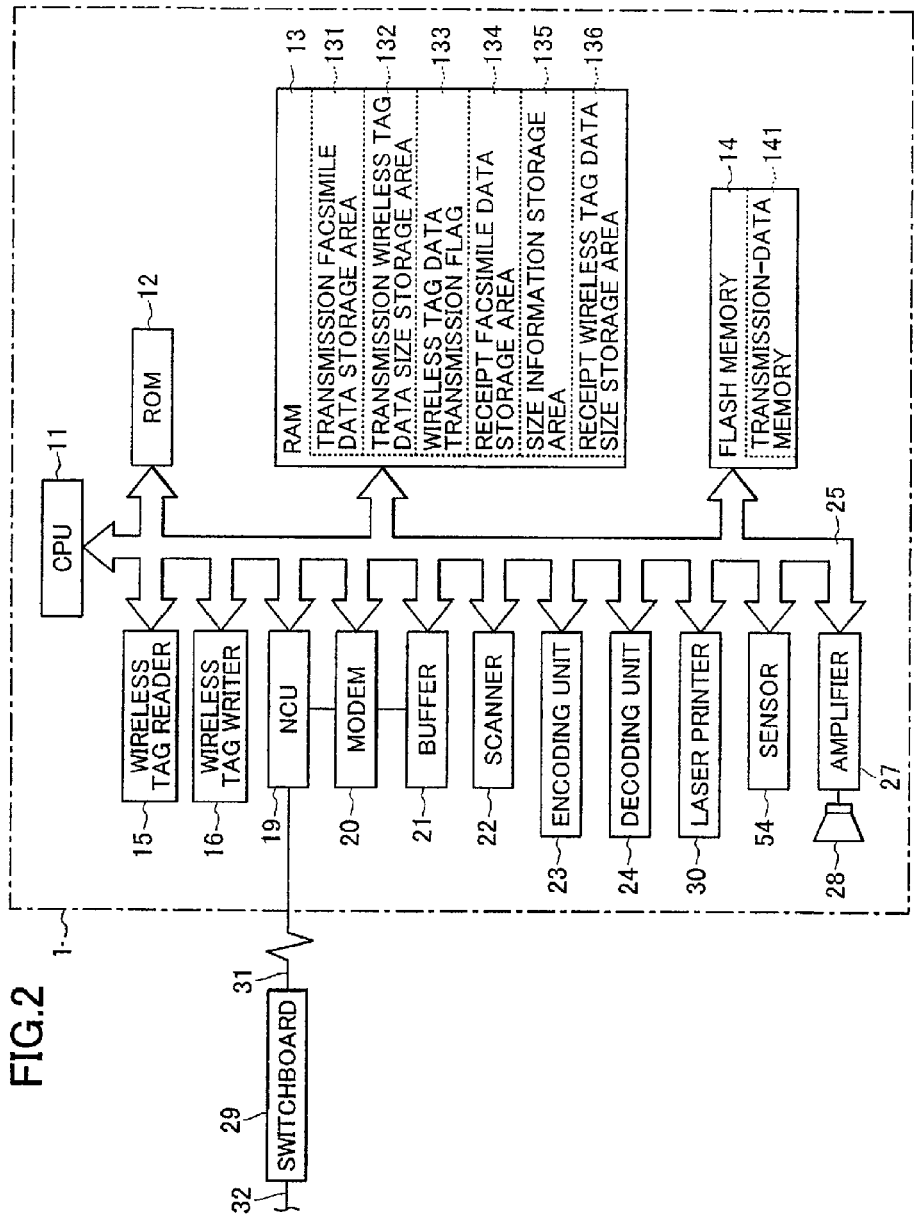
FIG. 2 is a block diagram showing a control system of the facsimile device.

Referring to FIG. 2, the facsimile device 1 has a CPU 11, a ROM 12, a RAM 13, a flash memory 14, the wireless tag reader 15, the wireless tag writer 16, a network control unit 19 (hereinafter referred to as "NCU"), a modem 20, a buffer 21, the scanner 22, an encoding unit 23, a decoding unit 24, the laser printer 30, the sensor 54, and an amplifier 27. These components are connected through a bus line 25.

The CPU 11 receives various signals from the NCU 19 which performs line control and supplies signals to other components of the device 1 through the bus line 25, controlling these components. That is, the CPU 11 performs data communication. The ROM 12 is not rewritable, and stores control programs that are executed by the CPU 11. More specifically, the ROM 12 stores the programs represented as the flowcharts of FIGS. 5 to 7.

The RAM 13 is a memory that temporarily stores various data while the facsimile device 1 is operating. The RAM 13 has a transmission facsimile data storage area 131, a transmission wireless tag data size storage area 132, a wireless tag data transmission flag 133, a receipt facsimile data storage area 134, a size information storage area 135, and a receipt wireless tag data size storage area 136.

The various data stored in the RAM 13 will be described with reference to FIGS. 3A and 3B.

Figure 3A:
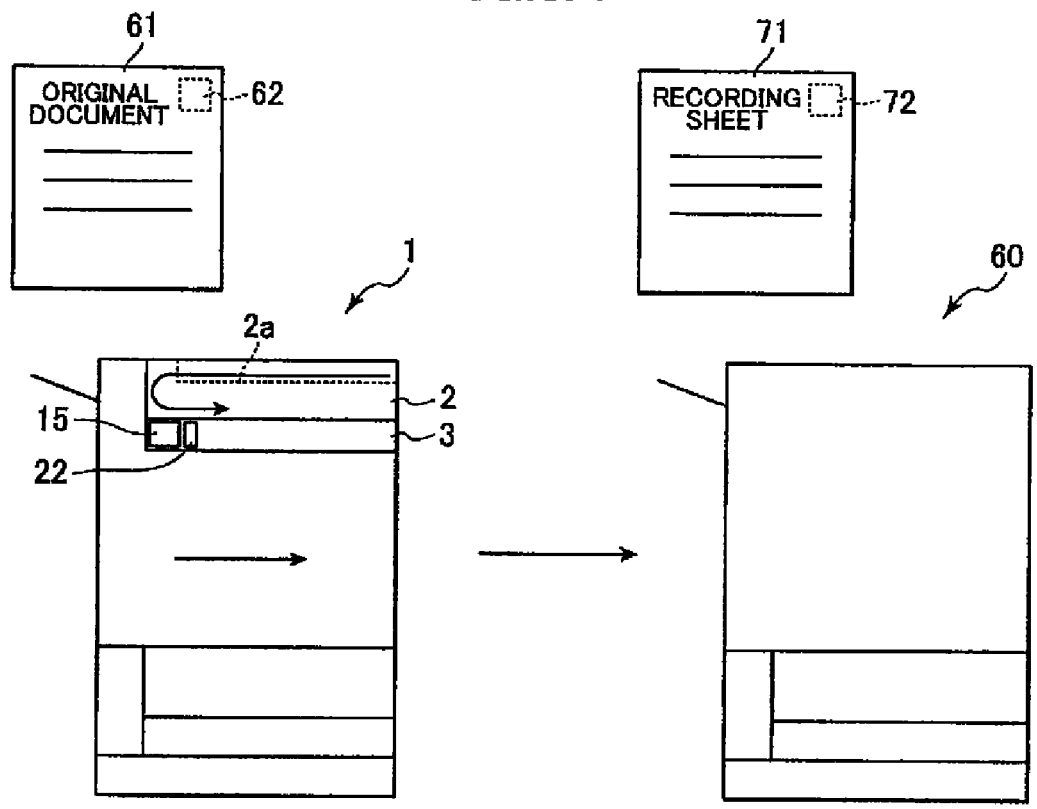
FIG. 3A is a schematic view illustrating communication between two facsimile devices.

As shown in FIG. 3A, an image (including figures and characters) has been formed on an original document 61 to be transmitted from the facsimile device 1. Further, a wireless tag 62 has been embedded in the original document 61. The original document 61 to be sent to the communication device 60 is set on the document table unit 2a. When the user touches the start key, the original document 61 is fed, page by page, to the reading position (not shown) in the scanner unit 3.

The reading position at which the wireless tag reader 15 reads the data from the wireless tag is located on the path in which the original document 61 is moved relative to the scanner 22. Hence, the wireless tag reader 15 reads the wireless tag data from the wireless tag 62 attached to the original document 61 while the automatic document feeder 2 is feeding the original document 61 to the reading position for the scanner 22. Thus, in order to read the image data and the wireless tag data from the original document 61, the user is simply required to place the original document 61 on the document table unit 2a. In view of this, the facsimile device 1 is user-friendly. In this embodiment, the data the wireless tag reader 15 reads from the wireless tag 62 is called wireless tag data. The positional relation of the scanner 22 and wireless tag reader 15 is not limited to the one shown in FIG. 1, but can be changed in various ways. For example, the wireless tag reader may be positioned outside the path in which the original document 61 is moved. In this case, only wireless tag data in the wireless tag can be first read as a whole rather the image data, if necessary.

Figure 3B:
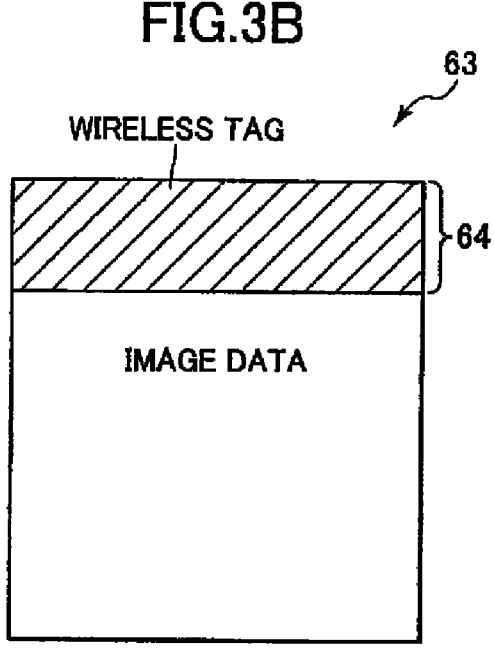
FIG. 3B is a diagram showing one-page facsimile data including wireless tag data and image data.

As shown in FIG. 3B, the facsimile data 63 is composed of wireless tag data and image data which are associated with each other in the same page. When the facsimile data 63 is transmitted to the communication device 60 having the same configuration as that of the facsimile device 1, the device 60 prints an image on a recording sheet 71 (see FIG. 3A), using the image data contained in the facsimile data 63. Further, the communication device 60 writes the wireless tag data contained the facsimile data 63 into the wireless tag 72 attached to the recording sheet 71. Thus, the image on the original document 61 and the wireless tag data in the wireless tag 62 attached to the original document 61 are transmitted from the facsimile device 1 to the communication device 60 and reproduced on the recording sheet 71 at the communication device 60 on a page basis. In this case the wireless tag 62 is written into the wireless tag 72 embedded in the recording sheet 71.

As shown in FIG. 3B, in the one-page facsimile data 63, the wireless tag data precedes the image data. Thus, only the image data is preventing from transmitting when any trouble occurs and the transmission of the facsimile data 63 from the facsimile device 1 to the communication device 60 is inevitably interrupted. The wireless tag data for each page can be reliably transmitted by facsimile. If the communication device 60 receives only the image data without receiving the wireless tag data that contains important information showing, for example, how to manage the image data, the image-data might be managed in an improper manner in the communication device 60. This is why the wireless tag data should be transmitted prior to the image data.

Before transmitting the image data 63 from the facsimile device 1 to the communication device 60, the facsimile device 1 notifies the device 60 of the size information representing the data size 64 of the wireless tag data.

Upon receiving the facsimile data 63, the communication device 60 classifies the facsimile data 63 in accordance with the size information to specify the wireless tag data of each page.

The facsimile device 1 will be further described with reference to FIG. 2. The transmission facsimile data storage area 131 is a storage area for storing the facsimile data 63 (see FIG. 3B) made from the image data and the wireless tag data. The transmission wireless tag data size storage area 132 is a storage area for storing, for each page, the data representing the size of the wireless tag data read by the wireless tag reader 15.

The wireless tag data transmission flag 133 is a flag that indicates whether the communication device 60 has the function of writing the wireless tag data. The facsimile device 1 processes the image data and the wireless tag data in order to perform facsimile transmission, depending on whether the device 60 can write the wireless tag data to the wireless tag. The operation of the facsimile device 1 will be explained later in detail with reference to FIG. 5.

The reception facsimile data storage area 134 is a storage area for storing the received facsimile data 63. The facsimile data 63 is erased from the reception facsimile data storage area 134 after the image based on the image data has been formed on the recording sheet 71 and the wireless tag data has been written in the wireless tag 72 attached to the recording sheet 71. If no recording sheets 71 attached with a wireless tag 72 are available, the facsimile data 63 is not erased, remaining saved in the received facsimile data storage area 134.

The size information storage area 135 is a storage area for storing the size information transmitted from a transmission-source facsimile device. The size information transmitted from the transmission-source facsimile device to the facsimile device 1 is "wireless tag data size=0," "wireless tag data size=indefinite," or "wireless tag data=definite." "Wireless tag data size=0" is the value indicating that the facsimile data 63 for any page contains no wireless tag data. "Wireless tag data size=indefinite" is the value indicating that the facsimile data 63 for any page contains wireless tag data of an indefinite size. "Wireless tag data=definite" is the value indicating that the facsimile data 63 for any page contains wireless tag data of a specific size.

The reception wireless tag data size storage area 136 is a storage area for storing the data size of the wireless tag data for each page, contained in the facsimile data 63 received from the transmission-source facsimile device is stored.

The flash memory 14 is a writable nonvolatile memory, and includes a transmission-data memory 141 for storing transmission data. As will be described later, the image data ready by the scanner 22 is stored in the transmission-data memory 141 if the transmission of the facsimile data to the communication device 60 is inhibited.

The wireless tag reader 15 is designed to read data from a wireless tag. The wireless tag writer 16 is configured to write data into a wireless tag.

Figure 4A:
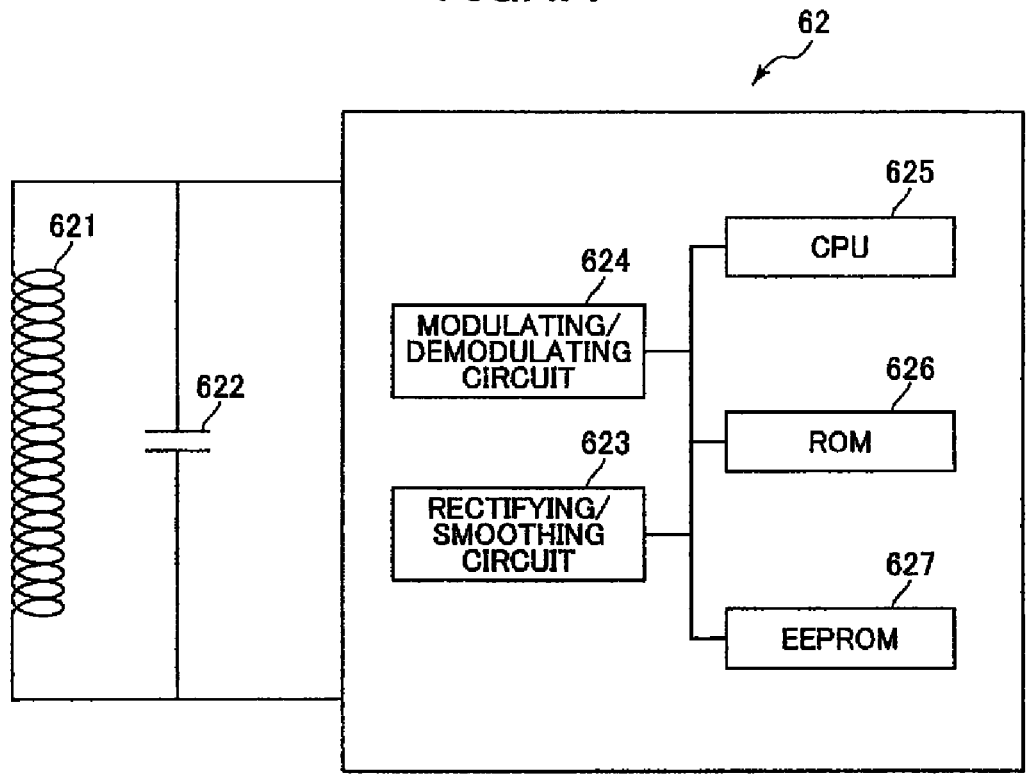
FIG. 4A is a circuit diagram showing a wireless tag.

The wireless tag 62, wireless tag reader 15 and wireless tag writer 16 will be described with reference to FIGS. 4A and 4B. Note that, the wireless tag 72 attached to the recoding sheet 71 described with reference to FIG. 3A has the same configuration as the wireless tag 62. As shown in FIG. 4A, the wireless tag 62 has an antenna coil 621, a resonance capacitor 622, a rectifying/smoothing circuit 623, a modulating/demodulating circuit 624, a CPU 625, a ROM 626, and an EEPROM 627. The antenna coil 621 is connected in parallel to the resonance capacitor 622, whereby the coil 621 and the capacitor 622 constitute a resonance circuit. The resonance circuit receives a power radio signal transmitted from the wireless tag reader 15 or wireless tag writer 16 and having a prescribed high frequency. The power radio signal is supplied to the rectifying/smoothing circuit 623.

The rectifying/smoothing circuit 623, which constitutes a power-supply circuit, receives the power radio signal from the resonance circuit. The circuit 623 rectifies and smoothes the power radio signal, generating a DC power of a specific voltage. The DC power is supplied to the CPU 625.

The signal transmitted from the wireless tag reader 15 or wireless tag writer 16 is superposed on the power radio signal, is demodulated by the modulating/demodulating circuit 624, and is supplied to the CPU 625.

The CPU 625 operates in accordance with the operating program stored in the ROM 626, performing a process using the signal input from the modulating/demodulating circuit 624. Thus, the CPU 625 writes the data received into the EEPROM 627 or read data from the EEPROM 627. The data read from the EEPROM 627 is modulated by the modulating/demodulating circuit 624 and transmitted as a radio signal from the antenna coil 621.

In the wireless tag 62, the rectifying/smoothing circuit 623, the modulating/demodulating circuit 624, the CPU 625, the ROM 626 and the EEPROM 627 are provided in the form of an IC chip. The IC chip is embedded in a recording sheet, together with the antenna coil 621.

Figure 4B:
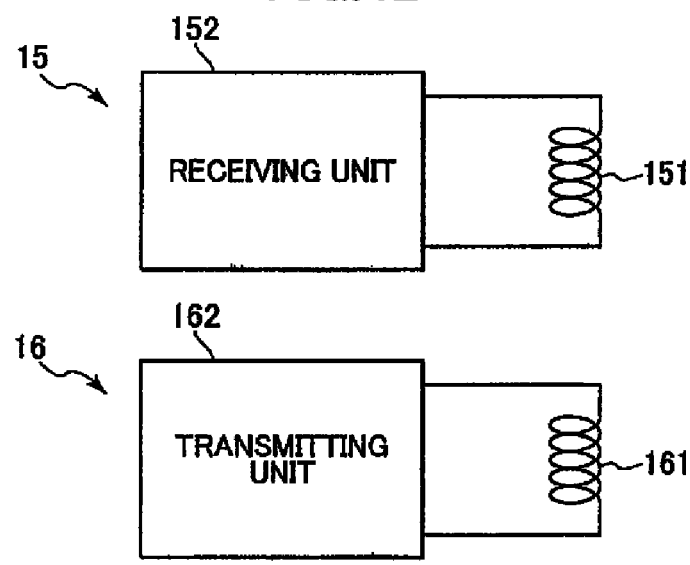
FIG. 4B is a block diagram illustrating a wireless tag reader and a wireless tag writer.

As shown in FIG. 4B, the wireless tag reader 15 has a receiving unit 152 that has a receiving-antenna coil 151, and wireless tag writer 16 has a transmitting unit 162 that has a transmitting-antenna coil 161.

In the wireless tag reader 15, the receiving-antenna coil 151 receives a radio signal transmitted from the wireless tag 62. The receiving unit 152 demodulates the radio signal and discriminates the signal as wireless tag data. Thus, the wireless tag reader 15 reads the wireless tag data from the wireless tag 62.

In the wireless tag writer 16, the transmitting unit 162 modulates a carrier signal, and the transmitting-antenna coil 161 transmits the modulated carrier signal as a power radio signal. Thereafter, the transmitting unit 162 modulates the wireless tag data to be transmitted, and superposes the same on the power radio signal. The transmitting-antenna coil 161 transmits the wireless tag data thus superposed. Thus, the wireless tag writer 16 can write the wireless tag data into the wireless tag 62.

Description will be made again with reference to FIG. 2. The modem 20 is configured to modulate and demodulate the facsimile data 63 and to transmit and receive various sequence signals for use in transmission control. The buffer 21 temporarily stores data that contains coded facsimile data received from and to be transmitted to, the facsimile device provided in the communication device.

The encoding unit 23 is configured to encode facsimile data 63. The decoding unit 24 is designed to read the received data from the buffer 21 and decode the same. The amplifier 27 is connected to a speaker 28. The speaker 28 can generate a calling tone.

The NCU 19 of the facsimile device 1 is connected to a telephone line 31. The telephone line 31 is connected to the switchboard 29 of the facsimile device 1. The switchboard 29 is connected by a telephone line 32 to the switchboard of the communication device 60. Thus, the facsimile device 1 is connected to the communication device 60 through a telephone line.

How the facsimile device 1 configured as described above performs facsimile transmission will be explained, with reference to FIG. 5. The facsimile transmission is started when the user pushes the start key (not shown) after the user places an original document on the document table unit 2a of the automatic document feeder 2 and then inputs the facsimile number of the communication device 60.

First, the automatic document feeder 2 feeds one page of the original document (Step S2). The wireless tag reader 15 detects the wireless tag 62 attached to the document (Step S4). Next, whether the wireless tag 62 stores wireless tag data or not is determined (Step S6). If no wireless tags 62 is attached to the document or no data is written in the wireless tag 62 attached to the document, determination is made that there is no wireless tag data (No in Step S6). In this case, the process goes to Step S12.

In Step S6, if the wireless tag data is stored, in other words, a wireless tag 62 is attached to the document and the wireless tag data has been written in the wireless tag 62 (Yes in Step S6), the wireless tag reader 15 reads the wireless tag data from the wireless tag 62 (Step S8). The data size of the wireless tag data thus read is detected, and the data size is recorded in the transmission wireless tag data size storage area 132 (Step S10). Next, the scanner 22 reads the image data from the original document, and the image data and the wireless tag data read in Step S8 are stored, page by page, as facsimile data 63, in the transmission facsimile data storage area 131 (Step S12).

Then, whether all pages of the original document have been read or not is determined (Step S14). If all pages have not been read (No in Step S14), the process returns to Step S2.

The original document is read, page by page. When all pages are read (Yes in Step 314), facsimile data 63 (see FIG. 3B), i.e., the combined wireless tag data and image data is generated for all pages and stored in the transmission facsimile data storage area 131. If no wireless tag data is detected from any page of the original document, facsimile data 63 containing no wireless tag data is generated.

Figure 6:
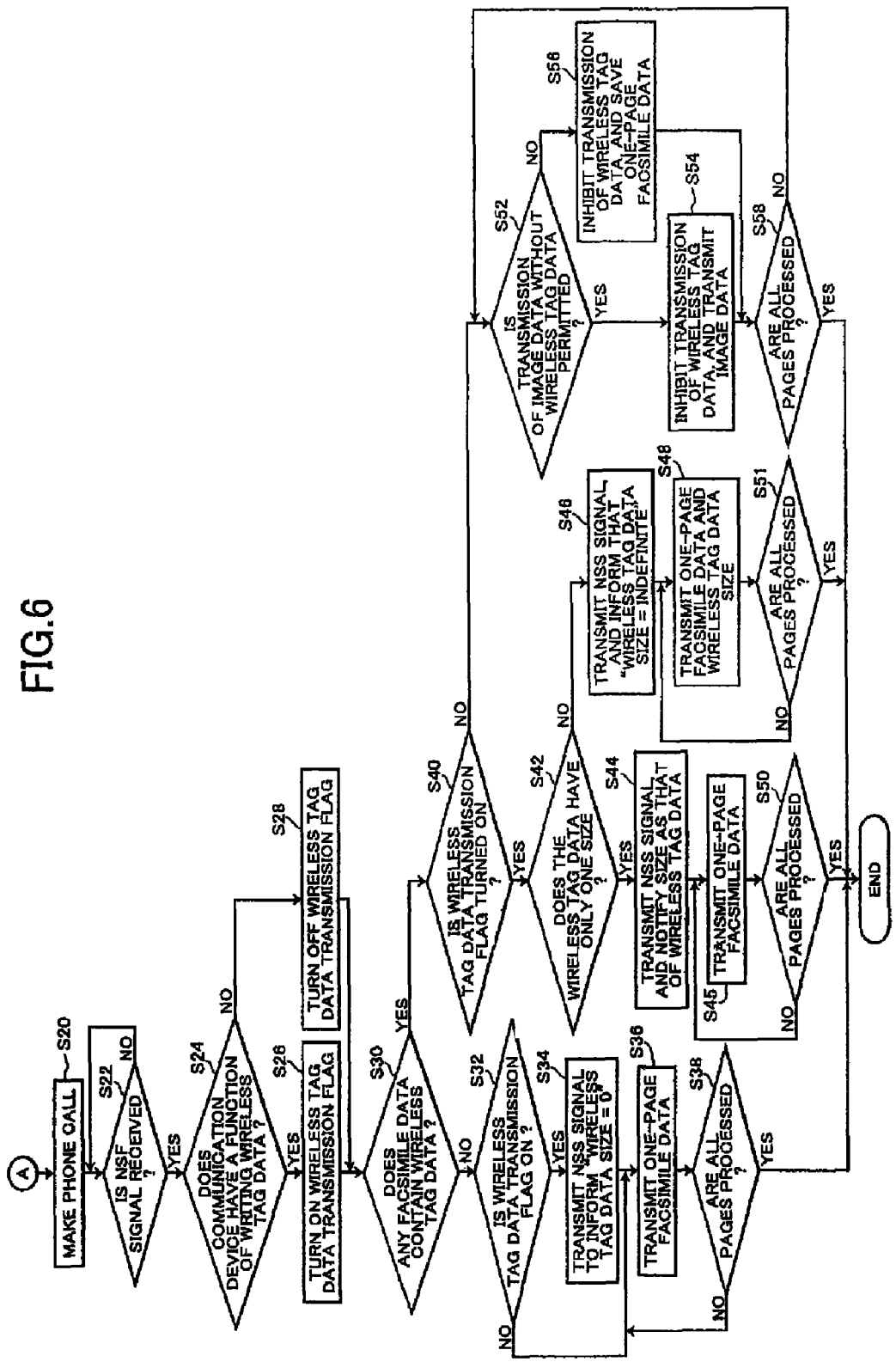
FIG. 6 is a flowchart showing a latter part of the procedure shown in FIG. 5.

The facsimile transmission will be further explained with reference to FIG. 6.

First, a phone call is made (Step S20) to initiate communication with the communication device 60. Then, whether an NSF signal has arrived from the communication device 60 or not is determined (Step S22). The NSF signal is a facsimile-control signal to transmit from a receiving apparatus to a transmitting apparatus. More precisely, the NSP signal is sent from the communication device 60 to inform the facsimile device 1 that the device 60 has a non-standard function provided by the manufacturer of the apparatus 60. If the facsimile device 1 does not receive the NSF signal (No in Step S22), the process is suspended. When the NSF signal is received (Yes in Step S22), whether the communication device 60 has the function of writing wireless tag data into a wireless tag is determined based on the received NSF signal (Step S24).

If the communication device 60 has the function of writing data into the wireless tag (Yes in Step S24), the wireless tag data transmission flag 133 is turned on (Step S26). If the device 60 does not have the function of writing data into the wireless tag (No in Step S24), the wireless tag data transmission flag 133 is turned off (Step S28).

Then, whether any facsimile data 63 to be transmitted contains wireless tag data or not is determined (Step S30), referring to the transmission wireless tag data size storage area 132. If any facsimile data 63 contains no wireless tag data (No in Step S30), whether the wireless tag data transmission flag 133 is turned on or not is determined (Step S32). If the wireless tag data transmission flag 133 is turned on (Yes in Step S32), an NSS signal is transmitted to the communication device 60 (Step S34). Note that the NSS signal is a facsimile-control signal to be transmitted from a transmitting apparatus to a receiving apparatus, to inform the receiving apparatus that the transmitting apparatus has non-standard functions.

The facsimile device 1 according to this embodiment transmits the NSS signal to the communication device 60 to inform the device 60 of the size information that represents the size 64 of the wireless tag data contained in the facsimile data 63 (See FIG. 3B). In this instance, the facsimile data 63 does not contain wireless tag data. Therefore, the NSS signal is transmitted to inform that "wireless tag data size=0" (Step S34).

If the wireless tag data transmission flag 133 is turned off (No in Step S32), Step 34 is skipped.

Next, the one-page facsimile data 63 stored in the transmission facsimile data storage area 131 is read and transmitted (Step S36). This facsimile data 63 to be transmitted represents the wireless tag data size 64 that is "0." That is, the data 63 is facsimile data containing no wireless tag data.

Step S36 is repeated until all pages have been processed (No in Step S38). When all pages are processed (Yes in Step S38), the facsimile transmission is terminated. Thus, the image data read by the scanner 22 is transmitted in the same way as in the ordinary facsimile transmission if the wireless tag data is not detected from the original document 61.

If the facsimile data 63 contains the wireless tag data (Yes in Step S30), Steps S40 to S58 are performed, so that the image data and the wireless tag data are processed in accordance with whether the wireless tag data transmission flag 133 is turned on or off.

At first, whether the wireless tag data transmission flag 133 is turned on or not is determined (Step S40). If the wireless tag data transmission flag 133 is turned on (Yes in Step S40), whether the wireless tag data has only one size or not is determined (Step S42), referring to the data size stored in the transmission wireless tag data size storage area 132.

If the wireless tag data has only one size (Yes in Step S42), an NSS signal is transmitted to the communication device 60, and the size information representing the tag data size is transmitted to the device 60 as size information (Step S44). Then, one-page facsimile data 63 is read from the transmission facsimile data storage area 131 and transmitted (Step S45). The facsimile data 63 to be transmitted now consists of image data and wireless tag data which are associated with one page of the original document. Step S45 is repeated until all pages have been processed (Step S50). When all pages are processed (Yes in Step S50), the facsimile transmission is terminated.

Thus, the wireless tag data has only one size, the information representing this size is transmitted to the communication device 60 prior to the transmission of the facsimile data 63. Therefore, the communication device 60, which has received the facsimile data 63, can discriminate the image data and the wireless tag data from the facsimile data 63 in accordance with the previously informed size information and can process these data. Since the size information representing one size needs to be transmitted only once for all pages of the document, the communication process has a smaller load than in the case where the information representing the wireless tag data is informed to the device 60 every time one-page data is transmitted.

There is the case in which the wireless tag data for one original document has two or more sizes (No in Step S42). In this case, an NSS signal is transmitted to the communication device 60 to inform that the wireless tag data size is "indefinite" (Step S46). That is, the device 60 is informed that the size of the wireless tag data is not limited to one. Hence, the communication device 60 can recognize that the wireless tag data to be transmitted has various sizes. Data can therefore be appropriately managed in the communication device 60.

Next, the one-page facsimile data 63 is read from the data stored in the transmission facsimile data storage area 131, and the data size representing the size of the wireless tag data contained in the one-page facsimile data 63 is read from the transmission wireless tag data size storage area 132. The facsimile data 63 and the data size, which are associated with each other, are transmitted (Step S48). Hence, the communication device 60 can distinguish the image data and the wireless tag data from each other in accordance with the data size of the wireless tag data transmitted for each page of the original document. The device 60 can therefore process the image data and the wireless tag data, even if the wireless tag data transmitted for one page differs in size from the wireless tag data transmitted for any other page.

Step S48 is repeated until all pages are processed (Step S51). When all pages are processed (Yes in Step S51), the facsimile transmission is terminated.

When the facsimile data 63 contains wireless tag data (Yes in Step S30), and the wireless tag data transmission flag 133 is turned off (No in Step S40). The operation of the facsimile device 1 will be explained. If the wireless tag data transmission flag 133 is turned off, that is, if the communication device 60 does not have the function of writing wireless tag data, the transmission of the wireless tag data from the facsimile device 1 to the communication device 60 is inhibited. This operation can prevent errors in the device 60 which may be caused when the wireless tag data is transmitted to the device 60 that cannot process the wireless tag data.

Then, determination is made whether any transmission of the image data without the wireless tag data is permitted (Step S52). The determination is made in the facsimile device 1, in accordance with the instruction made by the user or the instruction recorded in the wireless tag data.

That is, the image data may be transmitted without the wireless tag data, depending on the content of the wireless tag data and the image data. In this case, if the image data is transmitted without wireless tag data, the read image data is not wasted at all, increasing the operating efficiency.

If the wireless tag data contains important data, it is not desirable to transmit the image data alone without the wireless tag data. Hence, in the facsimile device 1 according to this embodiment, whether the image data should be transmitted along is determined in accordance with the user's instruction.

If the transmission of the image data without the wireless tag data is not permitted (No in Step S52), the transmission of the wireless tag data of the page is inhibited, and the one-page facsimile data 63 is saved in the transmission-data memory 141, in association with the Facsimile number of the communication device 60 (Step S56). This operation prevents the wasting of the image data read by the scanner 22. In this case, only the image data is saved in the transmission-data memory 141 instead of the facsimile data 63. Accordingly, retransmission of the image data can be avoided.

On the other hand, if the transmission of the image data without the wireless tag data is permitted (Yes in Step S52), the transmission of the wireless tag data is inhibited and the image data is transmitted (Step S54). In other words, only the image data is transmitted, not in association with the wireless tag data. In this case, only the page whose transmission is not permitted is saved in the transmission-data memory 141. The storage capacity of the memory can therefore be saved.

Until all pages are processed (Step S58), the process starting from step 52 are repeated. When all pages are processed (Yes in Step S58), the facsimile transmission is terminated.

In the facsimile transmission according to the present embodiment, the image data printed on the original document 61 and the wireless tag data written in the wireless tag 62, which are associated with each other, can be transmitted to the communication device 60.

The image data and the wireless tag data are processed, depending on whether the communication device 60 has the function of writing wireless tag data. Hence, data can be appropriately transmitted, irrespective of the type of the communication device 60.

Facsimile reception of the facsimile device 1 will be explained with reference to FIG. 7. The facsimile reception is a process that is started when a phone call arrives at the facsimile device 1 to initiate communication between the facsimile device 1 and the transmission-source facsimile device (not shown).

First, an NSF signal is transmitted to the transmission-source facsimile device (Step S62). The NSF signal informs the transmission-source facsimile device that the facsimile device 1 has a non-standard function, i.e., the function of writing wireless tag data.

Next, the facsimile device 1 stays in a standby sate until receiving an NSS signal (Step S64). When the facsimile device 1 receives the NSS signal (Yes in Step S64), the size information contained in the NSS signal is acquired and stored in the size information storage area 135 (Step S68).

Then, whether the size information acquired is "wireless tag data size=0" or not is determined (Step S70). If the size information acquired is "wireless tag data size=0" (Yes in Step S70), that is, if the received facsimile data 63 contains no wireless tag data, one-page facsimile data 63 is received and stored in the received facsimile data storage area 134 (Step S72). Step S72 is repeated until all pages of facsimile data are received (Yes in Step S74).

When all pages of facsimile data are received (Yes in Step S74), the laser printer 30 (see FIG. 1) forms an image on a recording sheet, using the image data contained in the one-page facsimile data 63 (Step S76). Step S76 is repeated until the facsimile data 63 for all pages is processed (Step S78).

When the facsimile data 63 for all pages is processed (step S78), the facsimile reception is terminated.

If the size information acquired is not be "wireless tag data size=0" (No in Step S70), whether the size information is "wireless tag data size indefinite" or not is determined (Step S80). If the size information is "wireless tag data size indefinite" (Yes in Step S80), the facsimile device 1 receives one-page facsimile data 63 and the size information representing the size of the wireless tag data (Step S82). The wireless tag data size can thus be acquired for each page. The received one-page facsimile data 63 is stored in the receipt facsimile-data storage area 134, and the size information about the received facsimile data is stored in the receipt wireless tag data size storage area 136. Process is repeated until the facsimile data for all pages is received (Step S86).

On the other hand, if the size information is not "wireless tag data size=0" (No in Step S70) and may not be "wireless tag data size=indefinite" (No in Step S80). That is, if the wireless tag data contained in one-page facsimile data 63 has only one size and the size information representing the sole size is already notified, the one-page facsimile data 63 is received and stored in the received facsimile data, storage area 134 (Step S84). That is, the size information is different from "wireless tag data size=indefinite," because the data size of the wireless tag data contained in each one-page facsimile data 63 has already been notified and the data size about each page need not be newly acquired. Thus, process is repeated until all pages of one-page facsimile data 63 are received (Step S86).

When all pages of one-page facsimile data 63 are received (Yes in Step S86) by repeating the process, one-page facsimile data 63 and the data size about the wireless tag data contained in the one-page facsimile data 63 are read (Step S87). If the size information is "wireless tag data size=indefinite," the data size for each page is read from the received wireless tag data size storage area 136. If the wireless tag data has only one size, the data representing the only one size is read from the size information storage area 135.

The size of the read wireless tag data is compared with the vacant storage capacity of the wireless tag 72, which the sensor 54 (see, FIG. 1) has detected. Then, whether recording sheets 71 on which data of a size corresponding to the vacant storage capacity can be printed are available or not is determined. In other words, whether the sheet-feeding tray unit 5 accommodates the recording sheets 71 or not is determined on which the wireless tag data for one page can be printed (Step S88).

If recording sheets 71 on which the wireless tag data for one page can be printed are not available (No in Step S88), neither the image data nor the wireless tag data is recorded (Step S98). Then, the information about the wireless tag, which is required in recording data, is displayed on the screen of the operation panel (not shown) (Step S100). The information displayed is, for example, a message of "There is data to be output. Please set a recording sheet with a 16 k-bit wireless tag," which informs of the existence of wireless tag data to be output and the storage capacity of the wireless tag into which the wireless tag data can be written. The user can therefore perform an appropriate activity such as setting of a required recording sheet in the sheet-feeding tray unit 5.

If the recording sheet 71 on which the wireless tag data for one page can be printed is available (Yes in Step S88), the recording sheet 71 that meets a requirement is fed from the sheet-feeding tray unit 5 (Step S89). The wireless tag writer 16 writes the wireless tag data contained in the facsimile data 63, into the wireless tag attached to the recording sheet 71 (Step S90).

Using the image data contained in the facsimile data 63, the laser printer 30 forms an image on the recording sheet 71 (Step S92). Thus, the image of the original document 61 transmitted by facsimile from the transmission-source facsimile device and the wireless tag data written in the wireless tags 62 attached to the document 61 can be reproduced, page by page, on the recording sheets 71 and in the wireless tags 72 embedded in the recording sheets 71.

After the facsimile data 63 has been recorded on the recording sheet 71, the data 63 is erased from the facsimile-data storage area 134 (Step S94). Then, process is repeated from Step S89 until all pages are processed (S96). If the wireless tag data on any page is too large to be written into the wireless tag (No in Step S88), the recording is interrupted. That is, the recording is interrupted (Step S98) if the recording sheets 71 on which wireless tag data can be written have run out or if facsimile data 63 containing wireless tag data is so large as to be written into the wireless tag 72 attached to the recording sheet 71 set in the sheet-feeding tray unit 5. Since the recording is thus interrupted, the image data is not reproduced as an image and the wireless tag data is not written into the wireless tag, but saved in the received facsimile-data storage area 134 without easing from the RAM 13. Hence, the same facsimile data need not be transmitted again from the transmission source.

The sensor 54 may detect that a recording sheet 71 on which the facsimile data 63 saved in the received facsimile-data storage area 134 can be recorded has accommodated set in the sheet-feeding tray unit 5. In this case, the recording of the facsimile data 63 saved in the received facsimile-data storage area 134 may be resumed.

As the processes is repeatedly performed, all pages of facsimile data 63 are recorded on the recording sheets 71 (Yes in Step S96). Thus, the facsimile reception sequence is terminated.

In the facsimile device 1 according to the present embodiment, the facsimile data received is processed in accordance with the size of the wireless tag data. Further, in the facsimile device 1, the image of the original document 61 received by facsimile and the wireless tag data written in the wireless tag 62 attached to the document 61 can be reproduced, page by page, on the recording sheets 71 and in the wireless tags 72 embedded in the recording sheets 71.

The present invention has been described with reference to an embodiment. This invention is not limited to the embodiment, nevertheless. Various changes and modifications can be made within the scope and spirit of the invention, as may be obvious to those skilled in the art.

In the facsimile transmission explained with reference to FIG. 6, for example, whether any transmission of the image data without the wireless tag data is permitted or not is determined in accordance with the setting of the facsimile device 1 or the instruction recorded in the wireless tag data (step S52). Instead, an inquiry may be displayed on the screen of the operation panel, asking the user whether the image data should be transmitted without including the wireless tag data, or should be saved in the transmission-data memory 141, without being transmitted. In this case, the image data is processed in accordance with the answer to the inquiry thus displayed.

In the facsimile device 1 according to the present embodiment, the wireless tag reader 15, wireless tag writer 16, scanner 22 and laser printer 30 may be externally provided with respect to the facsimile device 1 through cables.

Of course, the present invention can be applied to a facsimile device that reads image data from original documents placed on a flat bed.

In the facsimile reception sequence (see FIG. 7) performed in the facsimile device 1 according to the embodiment, a recording sheet 71 on which the wireless tag data for one page can be printed may be available (Yes in Step S88). In this case, the recording sheet 71 is fed from the sheet-feeding tray unit 5 (Step S89), and the wireless tag writer 16 writes the wireless tag data contained in the facsimile data 63, into the wireless tag attached to the recording sheet 71 (Step S90).

Assume that two or more recording sheets 71 which are available are found. A sheet 71 having no wireless tag 72 attached, or a sheet 71 having a wireless tag 72 having a minimum storage capacity can be selected and fed forward. In this case, recording sheets 71, each having a wireless tag 72 having a large storage capacity and hence being expensive, can be prevented from wasteful use.

In the facsimile reception sequence (see FIG. 7), an image is formed on a recording sheet 71 if the size information is "wireless tag data size=0" (Yes in Step S70). This recording sheet 71 may be either one that has no wireless tags 72 at all or one that has a wireless tag 72 having a minimum storage capacity. In this case, the recording sheets 71, each having a wireless tag that has a large storage capacity and hence being expensive, can be prevented from wasteful use.

Further, in the facsimile reception sequence (see FIG. 7), only any page for which recording sheets 71 that can hold wireless tag data are not available may not be recorded, and the data recording may be continued for any page for which recording sheets 71 that can hold wireless tag data are available. In other words, if a recording sheet 71 that can hold wireless tag data is found unavailable (No in Step S88), Steps S98 and S100 may not be performed. Rather, the process may go to Step S96, skipping Steps S89, S90, S92 and S94.

Thus, only the page that cannot be written can save the facsimile data 63, and the memory capacity for storing facsimile data 63 can therefore be saved.

Depending on the configuration of the receiving side device, the recording sheet and the wireless tag may be separately provided. In this case, in the facsimile reception sequence, when image data and the wireless tag data associated with the image are received, the image data is recorded on an ordinary recording sheet, and the wireless tag data is written into the wireless tag. Such a wireless tag which is not provided in the recording sheet has an adhesive portion as a label. The wireless tag may be automatically or manually adhered to the recording sheet after the image data has been recorded on the sheet. In this case, the wireless tag can be attached to the recording sheet. On the transmitting side, the wireless tag need not be provided in the recording sheet. Image data and wireless tag data can be read from the document and the wireless tag, respectively, if they are associated for each page.

What is claimed is:

1. A communication device, comprising:
   an image reading unit that reads image data from an original document on a page basis, the original document having a wireless tag including wireless tag data, the wireless tag data having a data size;
   a wireless tag reading unit that reads the wireless tag data from the wireless tag;
   a transmitting unit that associates the image data with the wireless tag data on a page basis to transmit the associated image data and wireless tag data to another device;
   a detecting unit that detects the data size of the wireless tag data as size information;
   a data-size notifying unit that notifies the another device of the size information; and
   a data-size determining unit that determines whether the detected data size of the wireless tag data is single or not, to generate a determination result, wherein
   the data-size notifying unit notifies the another device of the size information based on the determination result, and wherein,
   if the data-size determining unit determines that the detected data size of the wireless tag data is single, the data-size notifying unit notifies the size information indicating the detected data size to the another device before the transmitting unit transmits the associated image data and wireless tag data.

2. The communication device according to claim 1, further comprising a document-receiving unit that receives the original document on, wherein
the reading unit relatively moves with respect to the original document on the document-receiving unit to read the image data from the original document,
the wireless tag reading unit reads the wireless tag data from the wireless tag, while the reading unit relatively moves with respect to the original document.

3. The communication device according to claim 1, wherein, if the data-size determining unit determines that the detected data size of the wireless tag data is not single, the data-size notifying unit notifies the size information indicating that the detected data size of the wireless tag data is not single.

4. The communication device according to claim 1, wherein, if the data-size determining unit determines that the detected data size of the wireless tag data is not single, the transmitting unit transmits the image data, the wireless tag data, and the detected data size on the page basis.

5. A communication device, comprising:
a receiving unit that receives image data on a page basis and wireless tag data associated with the image data, the wireless tag data having data size;
a recording unit that forms an image on a recording medium on the basis of the image data, the recording medium including a wireless tag having a storage capacity, the recording unit writing the wireless tag data in the wireless tag;
a data-size information acquiring unit that acquires the data size of the wireless tag data as size information;
a recording-control unit that controls formation of the image and writing of the wireless tag data by the recording unit in accordance with the size information;
a recording-medium detecting unit that detects the storage capacity of the wireless tag; and
a data-size determining unit that determines whether the detected data size of the wireless tag data is single or not, wherein
if the data-size determining unit determines that the detected data size of the wireless tag data is single, the recording-control unit controls the formation of the image and the writing of the wireless tag data by the recording unit, in accordance with the detected storage capacity of the wireless tag and the size information.

6. The communication device according to claim 5, further comprising;

a data-size confirming unit that confirms the data size of wireless tag data on the page basis, if the data-size determining unit determines that the detected data size of the wireless tag data is not single, wherein
a recording-control unit controls the formation of the image and the writing of the wireless tag data by the recording unit in accordance with the detected storage capacity of the wireless tag and the confirmed data size of the wireless tag data.

7. The communication device according to claim 5, wherein the recording-control unit comprises:
a recording medium determining unit that determines whether the wireless tag of the recording medium has the storage capacity for writing all the wireless tag data or not, on the basis of the data size of the wireless tag data;
a recording-interrupting unit that interrupts the formation of the image data and the writing of the wireless tag data by the recording unit, if the recording medium determining unit determines that the wireless tag of the recording medium does not have the storage capacity for writing all the wireless tag data; and
a data-saving unit that saves the image data which has not been formed on the recording medium and the wireless tag data which has not been written in the wireless tag because of an interruption of the recording-interrupting unit.

8. The communication device according to claim 7, further comprising: a notifying unit that notifies a user of information related to a storage capacity of an additional wireless tag which is capable of saving all the wireless tag data, if the data-saving unit saves the image data which has not been formed on the recording medium and the wireless tag data which has not been written in the wireless tag.

9. The communication device according to claim 7, wherein
the recording medium determining unit determines whether the wireless tag of the recording medium for each page has the storage capacity for writing all the wireless tag data,
the data-saving unit saves the image data and the wireless tag data, if the recording medium determining unit determines that the wireless tag of the recording medium for each page does not have the storage capacity, and
the recording-control unit controls the formation of the image and the writing of the wireless tag data by the recording unit when the recording medium determining unit determines that the wireless tag of the recording medium for the page has the storage capacity for writing all the wireless tag data.

* * * * *